(No Model.) S. B. BLISS. 2 Sheets—Sheet 2.
RAISIN SEEDER.
No. 513,704. Patented Jan. 30, 1894.
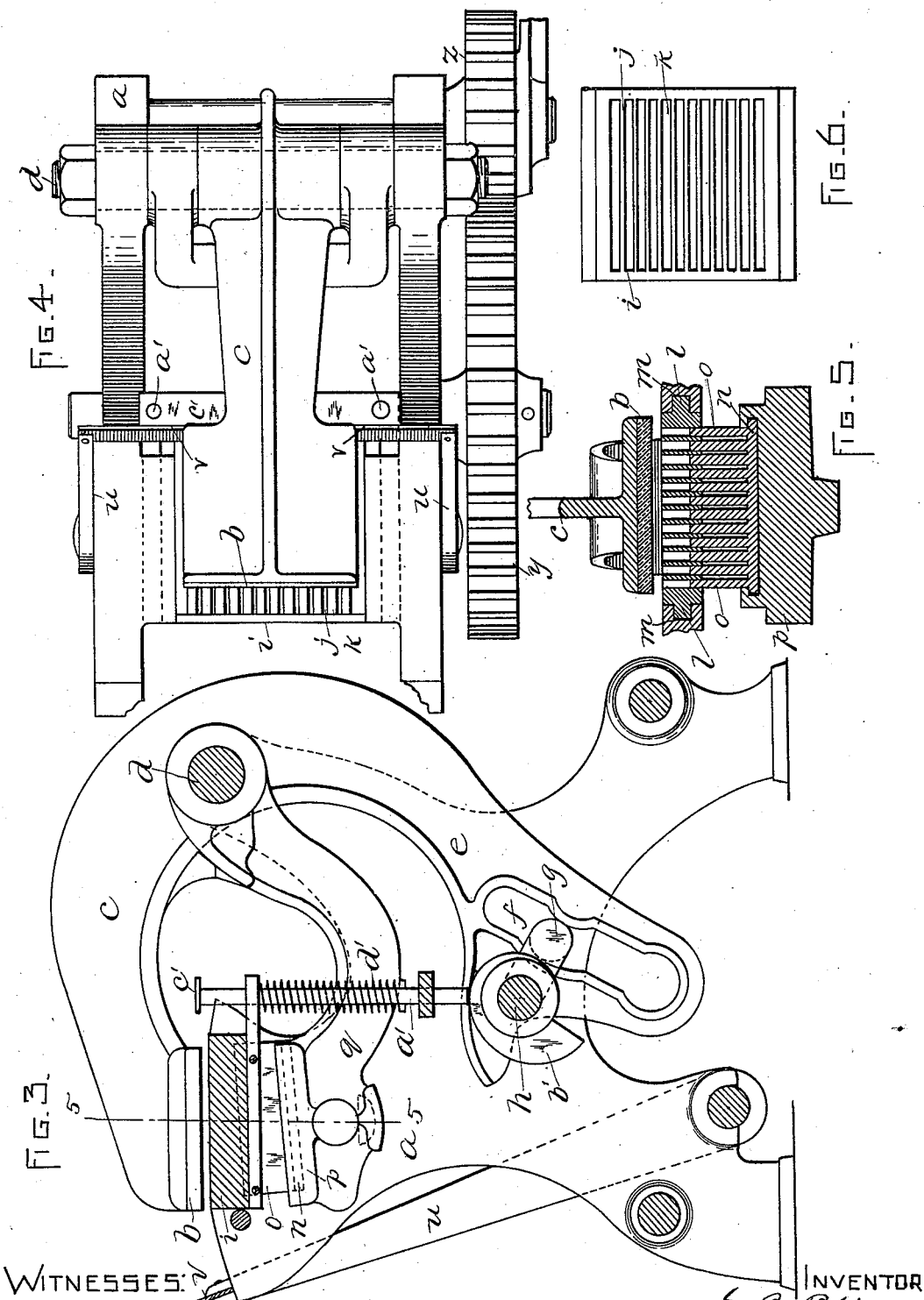
WITNESSES:
H. A. Hall.
M. W. Jackson.
INVENTOR:
S. B. Bliss,
by Wight, Brown & Bernsley.
Attys.

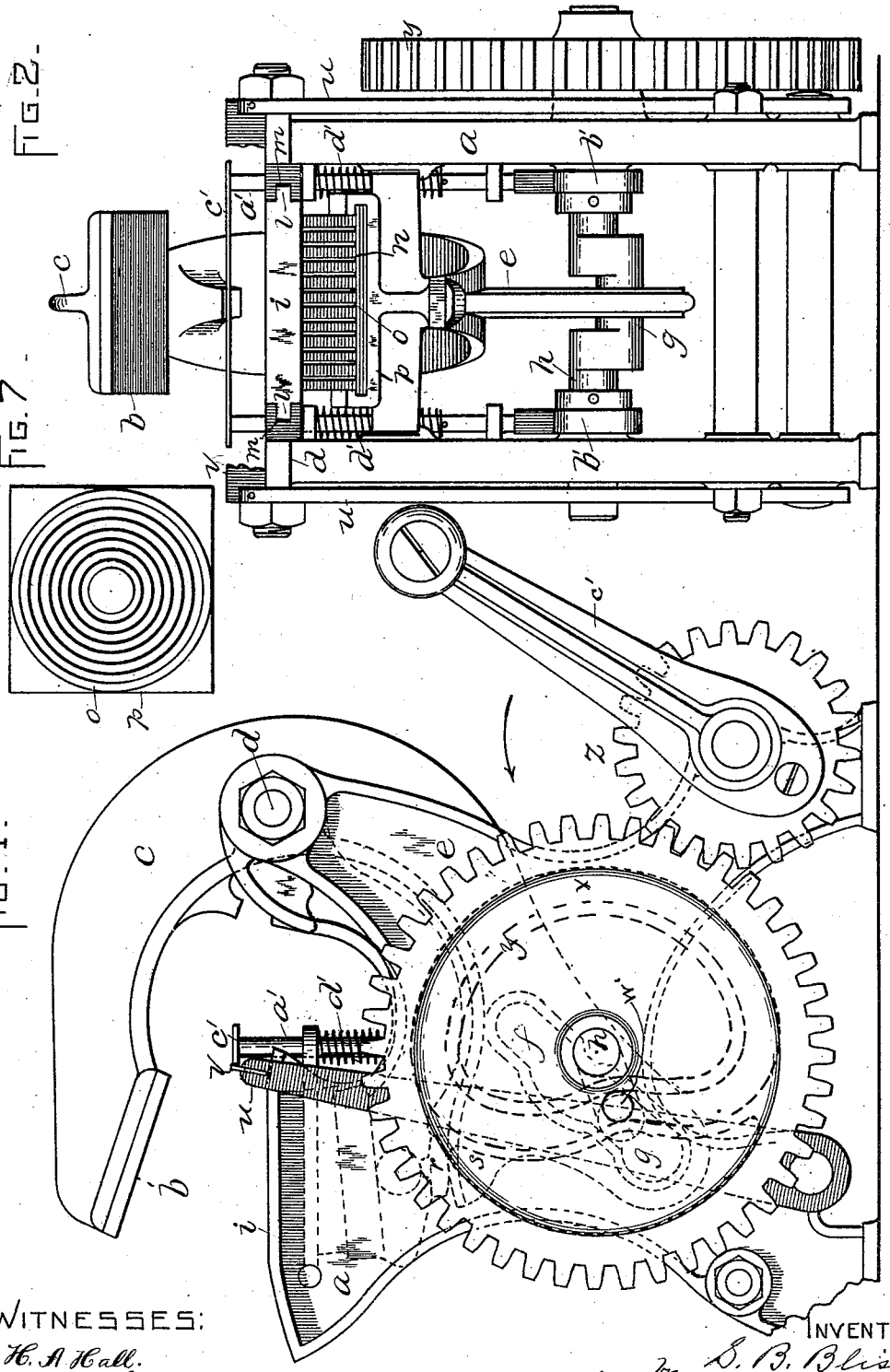

UNITED STATES PATENT OFFICE.

SAMUEL B. BLISS, OF RIVERSIDE, CALIFORNIA.

RAISIN-SEEDER.

SPECIFICATION forming part of Letters Patent No. 513,704, dated January 30, 1894.

Application filed November 11, 1892. Serial No. 451,626. (No model.)

*To all whom it may concern:*

Be it known that I, SAMUEL B. BLISS, of Riverside, in the county of San Bernardino and State of California, have invented certain new and useful Improvements in Raisin-Seeders, of which the following is a specification.

This invention has relation to devices for separating or removing the seeds or stones from fruit, and has particular reference to "raisin seeders" so called.

Heretofore in seeding raisins by implements or machines, it has been common to so construct the devices that the seeds may be pushed out of the fruit. This mode has been practiced with varying success, but not, so far as I am aware, with entire satisfaction.

In the practice of my invention I reverse the commonly employed method, and press the fruit away from the seeds, removing or discharging the latter, and recovering the former. I accomplish this end by means of various forms, that which I have chosen to illustrate herein consisting of a compression plate or bed of soft or yielding material, or it may be a plate or bed of metal or other hard substance provided with a soft elastic or yielding face, which compression plate is adapted to co-operate with a grooved, slotted, grated or foraminous bed or base, in the interstices or openings in which the expelling tongues of another plate or bed are arranged to reciprocate. Stated in other words, the bed or base may be composed of two or more parts, one part, which may be termed the "grated" part being provided with interstices or openings, smaller than the raisin seeds, and the other part, which may be termed the "tongued" part, comprising in its construction projections or tongues fitted within the interstices or openings of the grated parts and adapted to reciprocate therein, or to have the grated part reciprocated with respect thereto. These parts are so constructed and arranged that a raisin may be placed upon the bed or base (the tongued part being sufficiently withdrawn to leave the insterstices open), and the compression plate brought to bear upon the raisin with sufficient force to press the fruit into the spaces or openings in the base, and leave the seeds upon the surface, so that they may be readily removed therefrom. After the removal of the seeds the tongued part of the base is moved sufficiently to cause the projections or tongues thereof to eject the fruit from the interstices of the grated part, so that said fruit may be scraped off or otherwise recovered, all as is hereinafter fully described and claimed.

Reference is to be had to the annexed drawings, and to the letters marked thereon, forming a part of this specification, the same letters designating the same parts or features, as the case may be, wherever they occur.

Figure 1, is a side elevation of my improved raisin seeder complete. Fig. 2, is a front elevation thereof. Fig. 3, is a vertical central sectional view of the same. Fig. 4, is a top plan view of the machine. Fig. 5, is a vertical sectional view taken on line 5 5 of Fig. 3. Fig. 6, is a plan view of the grated bed. Fig. 7, is a plan view of a modified form of the grated bed.

In the drawings $a$ designates a frame which may be made of metal or any other suitable material, adapting it to support the several operative parts.

$b$ is a compression plate or platen formed of or connected with the forward end of the upper arm $c$ of a lever fulcrumed on a rod $d$ supported in the frame. The said compression plate may be composed of any suitable elastic material to adapt it to the purpose to be presently explained. As herein shown it consists of a back or foundation of metal and a facing of caoutchouc or rubber. The lower arm $e$ of the lever aforesaid extends downward and inward, the inner end being slotted as at $f$, a crank $g$ on the cam shaft $h$ being arranged to operate in the said slot and move the lever so as to raise and lower the compression plate, as will be readily understood without further description. Any other means for operating the compression plate, however, may be employed.

$i$ is what I term the grated bed which may be made of bars, rods, or plates $j$, leaving slots or spaces $k$ between. The said bars, rods or plates may be straight as shown in Figs. 1 to 6, or they may be circular as shown in Fig. 7, or any other suitable form. The bed $i$ may have tongues $l$ formed on its sides, which may fit grooves $m$ formed in a suitable part of the frame so as to enable the said grated bed to be arranged in position on, and supported by, the frame below the compression plate. Any other suitable means may, however, be provided for maintaining the grated bed in place.

$n$ designates the tongued bed, which consists of a plate provided with tongues or projections $o$, of a form corresponding with the openings or interstices in the grated bed, and fitting therein, that is to say, if the openings or slots in the grated bed are circular, the tongues on the tongued bed will be of corresponding form, and so on.

$p$ designates a plate or platen, upon which the tongued bed rests, the said platen forming a part of, or being connected with, the forward end of an arm $q$, pivoted at its rear end upon a rod $d$. The tongued bed like the grated bed may have tongues formed on its sides which may fit into corresponding grooves formed in the plate or platen so as to enable the said tongued bed to be readily removed and replaced. Other means may however, be provided for supporting the tongued bed in place. The plate $p$ is provided on its under side with a projection $r$ which rests upon a projection $s$, on the upper end of the arm $e$, as shown, so that as said arm $e$ is raised and lowered by the operation of the crank $g$, the plate or platen $p$ and the tongue bed will also be raised and lowered. Projections on the sides of the plate or platen may be made to engage projections on the frame so as to limit the downward motion of the said plate or platen, it being understood that the latter may be lowered by gravitation, and be raised by means connected with the arm $e$ as before described.

$u$ designate levers fulcrumed at their lower ends upon a rod connected with the frame, and supporting at their upper ends a blade or scraper $v$. That one of the levers $u$ adjacent to the gear wheel $y$ is provided with a pin or it may be an anti-friction roll $w$ which extends into a cam groove $x$, shown in dotted lines in Fig. 1, formed in the side of the said gear wheel $y$ secured on the cam shaft, so that as the said wheel is rotated as it may be a pinion $z$ secured on a shaft, having bearings in the frame to which is attached a crank $g$ for the turning of said shaft, the said levers $u$ will be oscillated, moving the blade or scraper $v$ back and forth across the grated bed, as will be readily understood.

$a'$ designate rods arranged in suitable bearings in the frame, and resting at their lower ends upon cams $b'$ secured on the cam shaft. Upon the upper ends of the rods $a'$ is a blade or scraper $c'$.

$d'$ designates springs which are constructed and arranged to press the rods down upon the cams $b'$.

The construction and arrangement of the parts thus far described are such that with the blade or scraper $v$ in its most forward position as represented in Fig. 3, and with the compression plate raised and the tongue lowered, a raisin may be placed upon the grated bed, and the crank turned in the direction indicated by the arrow in Fig. 1, when the compression plate will descend upon the raisin on the grated bed, press the fruit or meat thereof into the interstices or openings of the bed, leaving the seeds on the grated surface, the seeds sinking into the soft elastic compression plate when the latter is pressed upon the raisin. By further movement of the crank the compression plate will be raised, and the scraper or blade $v$ will be moved across the grated bed, scraping off the seeds thereon from the rear edge of the said bed. While the scraper $v$ is being moved rearwardly as described, the cams $b'$ acting on the rods $a'$ will raise the blade or scraper $c'$ so that when the blade $v$ arrives at its most rearward position, the blade $c'$ will be raised to its highest position, all as is represented in Fig. 1. By a further movement of the crank, the cams $b'$ will be moved so as to allow the rods $a'$ to snap off from the highest to the lowest point, of said cams by the action of the springs $d'$, and so cause the blade $c'$ to quickly descend and knock or scrape off the seeds from the blade $v$ if any seeds should happen to adhere thereto. After the blade $v$ may have arrived at its most rearward position, and before it starts to return, the tongued bed will be raised by the means hereinbefore described, carrying the tongues or projections thereon upward through the openings or interstices of the grated bed, ejecting the fruit pressed therein so that the same may be brought to the surface of the grated bed, and so that the scraper $v$ upon return to its forward position may scrape the fruit or meat of the raisin off from the front edge of the grated bed into a suitable receptacle which may be placed in position to receive the same, when by further movement of the crank the various parts of the machine may be brought to their first mentioned position, and the operation before described, repeated.

I do not limit myself to the means herein shown for operating the several parts, since it is obvious that these may be varied in many ways without departing from the nature or spirit of the invention.

Having thus explained the nature of the invention and described a way of constructing and using the same, though without attempting to set forth all of the forms in which it may be made or all of the modes of its use, it is declared that what is claimed is—

1. A bed for a raisin seeder, comprising in its construction a grated part having interstices or openings into which the meat of the raisins may be pressed, but which will not admit the seeds, and a tongued part having ejectors or tongues adapted to be reciprocated in the openings or interstices of the grated part, as set forth.

2. A raisin seeder comprising in its construction a bed or part provided with openings or interstices into which the meat of the raisin may be pressed, but which will not admit the seeds, a platen or part provided with a face of soft elastic material, and a part provided with tongues or ejectors adapted to reciprocate in the interstices of the first-mentioned part to eject material therefrom, as set forth.

3. A raisin seeder, comprising in its construction a soft elastic or yielding compression plate, a bed provided with interstices or openings into which the meat of the raisin may be pressed, but which will not admit the seeds, and a bed part provided with tongues or ejectors adapted to be reciprocated in the openings or interstices of the bed to eject the fruit therefrom, and the reciprocating part or scraper constructed and arranged to move across the surface of the bed to scrape the fruit and seeds therefrom, as set forth.

4. A raisin seeder, comprising in its construction a soft, elastic plate for pressing the fruit away from the seeds a bed provided with openings into which the meat of the raisins may be pressed, but which will not admit the seeds, for receiving the fruit, a bed provided with projections adapted to be reciprocated in the openings of the first-mentioned bed to eject the fruit, a reciprocating blade or scraper to remove the seeds and fruit from the bed, and a movable blade or scraper adapted to be moved in juxtaposition to the first-mentioned blade to scrape off adhering seeds or fruit thereon, as set forth.

In testimony whereof I have signed my name to this specification, in the presence of two subscribing witnesses, this 13th day of October, A. D. 1892.

SAMUEL B. BLISS.

Witnesses:
ARTHUR W. CROSSLEY,
L. G. DENNETT.